US011828305B2

(12) United States Patent
Aoki et al.

(10) Patent No.: US 11,828,305 B2
(45) Date of Patent: Nov. 28, 2023

(54) MULTI-CONTROL VALVE DEVICE

(71) Applicant: KAWASAKI JUKOGYO KABUSHIKI KAISHA, Kobe (JP)

(72) Inventors: Seiji Aoki, Kobe (JP); Yoshiyuki Tode, Kobe (JP); Koji Yamasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/756,898

(22) PCT Filed: Oct. 16, 2020

(86) PCT No.: PCT/JP2020/039181
§ 371 (c)(1),
(2) Date: Jun. 3, 2022

(87) PCT Pub. No.: WO2021/111745
PCT Pub. Date: Jun. 10, 2021

(65) Prior Publication Data
US 2023/0013888 A1    Jan. 19, 2023

(30) Foreign Application Priority Data
Dec. 6, 2019    (JP) .................................. 2019-221200

(51) Int. Cl.
*F15B 13/08*    (2006.01)
*E02F 9/22*    (2006.01)
(Continued)

(52) U.S. Cl.
CPC ...... *F15B 13/0842* (2013.01); *F15B 13/0821* (2013.01); *F15B 13/0871* (2013.01);
(Continued)

(58) Field of Classification Search
CPC .............. F15B 13/0842; F15B 13/0821; F15B 13/0871; F15B 2211/526; F15B 13/044;
(Continued)

(56) References Cited

U.S. PATENT DOCUMENTS 2,650,609 A * 9/1953 Herbst ................ F15B 13/0431
91/437
4,718,451 A * 1/1988 Kosugi ............... F15B 13/0814
137/884
(Continued)

FOREIGN PATENT DOCUMENTS

CN       105090148 A    11/2015
JP       2013238279 A   11/2013
(Continued)

*Primary Examiner* — Minh Q Le
(74) *Attorney, Agent, or Firm* — Alleman Hall Creasman & Tuttle LLP

(57) ABSTRACT

A multi-control valve device includes: a valve block including a plurality of valve holes; a plurality of spools movably housed in the plurality of valve holes in a one-to-one correspondence; one or more attachment parts provided on the valve block; and a plurality of solenoid valves provided on the one or more attachment parts in a one-to-one correspondence with the plurality of spools and each of which reduces a primary pressure, outputs a secondary pressure to a corresponding one of the plurality of spools, and moves the spool. The valve block includes a primary pressure supply passage through which the primary pressure is supplied to each of the plurality of solenoid valves.

7 Claims, 9 Drawing Sheets

(51) Int. Cl.
*F16K 3/24* (2006.01)
*F16K 27/04* (2006.01)
*F15B 13/043* (2006.01)

(52) U.S. Cl.
CPC ......... *E02F 9/2267* (2013.01); *F15B 13/0433* (2013.01); *F15B 13/0814* (2013.01); *F15B 13/0817* (2013.01); *F15B 2211/526* (2013.01); *F16K 3/24* (2013.01); *F16K 27/04* (2013.01)

(58) Field of Classification Search
CPC .. F15B 15/18; F15B 13/0433; F15B 13/0817; E02F 9/2267; F16K 11/22; F16K 11/24
USPC ......... 137/884, 487.5, 486, 488, 490, 489.5, 137/596.14, 596.16; 251/28, 30.01
See application file for complete search history.

(56) References Cited

U.S. PATENT DOCUMENTS

| | | | | |
|---|---|---|---|---|
| 5,632,306 A | * | 5/1997 | Taka | F15B 13/0435 137/884 |
| 5,704,399 A | * | 1/1998 | Hayashi | F15B 13/0857 137/271 |
| 5,749,395 A | * | 5/1998 | Hayashi | F15B 13/0857 137/884 |
| 6,354,185 B1 | * | 3/2002 | Sturman | F15B 11/006 91/464 |
| 2015/0107712 A1 | * | 4/2015 | Kobayashi | F16K 27/041 137/884 |
| 2015/0226236 A1 | | 8/2015 | Fujiwara | |
| 2015/0337969 A1 | | 11/2015 | Choi et al. | |
| 2018/0112685 A1 | | 4/2018 | Beschorner et al. | |
| 2018/0135766 A1 | * | 5/2018 | Miyazoe | F15B 13/0871 |
| 2018/0298922 A1 | * | 10/2018 | Matsuura | F16K 27/003 |
| 2019/0072115 A1 | * | 3/2019 | Isogai | F15B 11/00 |
| 2021/0285554 A1 | * | 9/2021 | Orimoto | E02F 9/2267 |
| 2022/0403857 A1 | * | 12/2022 | Kondo | F16K 11/22 |

FOREIGN PATENT DOCUMENTS

| | | |
|---|---|---|
| JP | 201495399 A | 5/2014 |
| JP | 201817347 A | 2/2018 |
| KR | 1020150134756 A | 12/2015 |

* cited by examiner

MULTI-CONTROL VALVE DEVICE

TECHNICAL FIELD

The present invention relates to a multi-control valve device including more than one spool.

BACKGROUND ART

Construction equipment or the like includes a multi-control valve device in order to move more than one actuator individually. The multi-control valve device is configured so that more than one spool is housed in a valve block. Known examples of such a multi-control valve device include the multi-control valve device disclosed in Patent Literature (PTL) 1.

CITATION LIST

Patent Literature

PTL 1: Japanese Laid-Open Patent Application Publication No. 2013-238279

SUMMARY OF INVENTION

Technical Problem

Regarding such a multi-control valve device as that disclosed in PTL 1, a multi-control valve device configured to control the position of the spool using a solenoid valve has been developed. In this configuration, at least one solenoid valve is required for each spool. Each solenoid valve needs to be supplied individually with a primary pressure; if a primary pressure supply passage for supplying the primary pressure is randomly formed, the primary pressure supply passage is formed into a complex shape, making the configuration of the valve block complicated.

Thus, an object of the present invention is to provide a multi-control valve device in which a valve block has a simplified configuration.

Solution to Problem

A multi-control valve device according to the present invention includes: a valve block including a plurality of valve holes; a plurality of spools movably housed in the plurality of valve holes in a one-to-one correspondence; one or more attachment parts provided on the valve block; and a plurality of solenoid valves provided on the one or more attachment parts in a one-to-one correspondence with the plurality of spools and each of which reduces a primary pressure, outputs a secondary pressure to a corresponding one of the plurality of spools, and moves the spool. The valve block includes a primary pressure supply passage through which the primary pressure is supplied to each of the plurality of solenoid valves.

According to the present invention, at least a portion of the primary pressure supply passage can be shared, and thus the shape of the primary pressure supply passage can be simplified, and the configuration of the valve block can be simplified.

Advantageous Effects of Invention

According to the present invention, the configuration of the valve block can be simplified.

The above object, other objects, features, and advantages of the present invention will be made clear by the following detailed explanation of preferred embodiments with reference to the attached drawings.

DESCRIPTION OF EMBODIMENTS

Hereinafter, multi-control valve devices 1, 100, 200 according to Embodiments 1 to 3 of the present invention will be described with reference to the aforementioned drawings. Note that the concept of directions mentioned in the following description is used for the sake of explanation; the orientations, etc., of elements according to the present invention are not limited to these directions. Each of the multi-control valve devices 1, 100, 200 described below is merely one embodiment of the present invention. Thus, the present invention is not limited to the embodiments and may be subject to addition, deletion, and alteration within the scope of the essence of the present invention.

Embodiment 1

Figure 1:
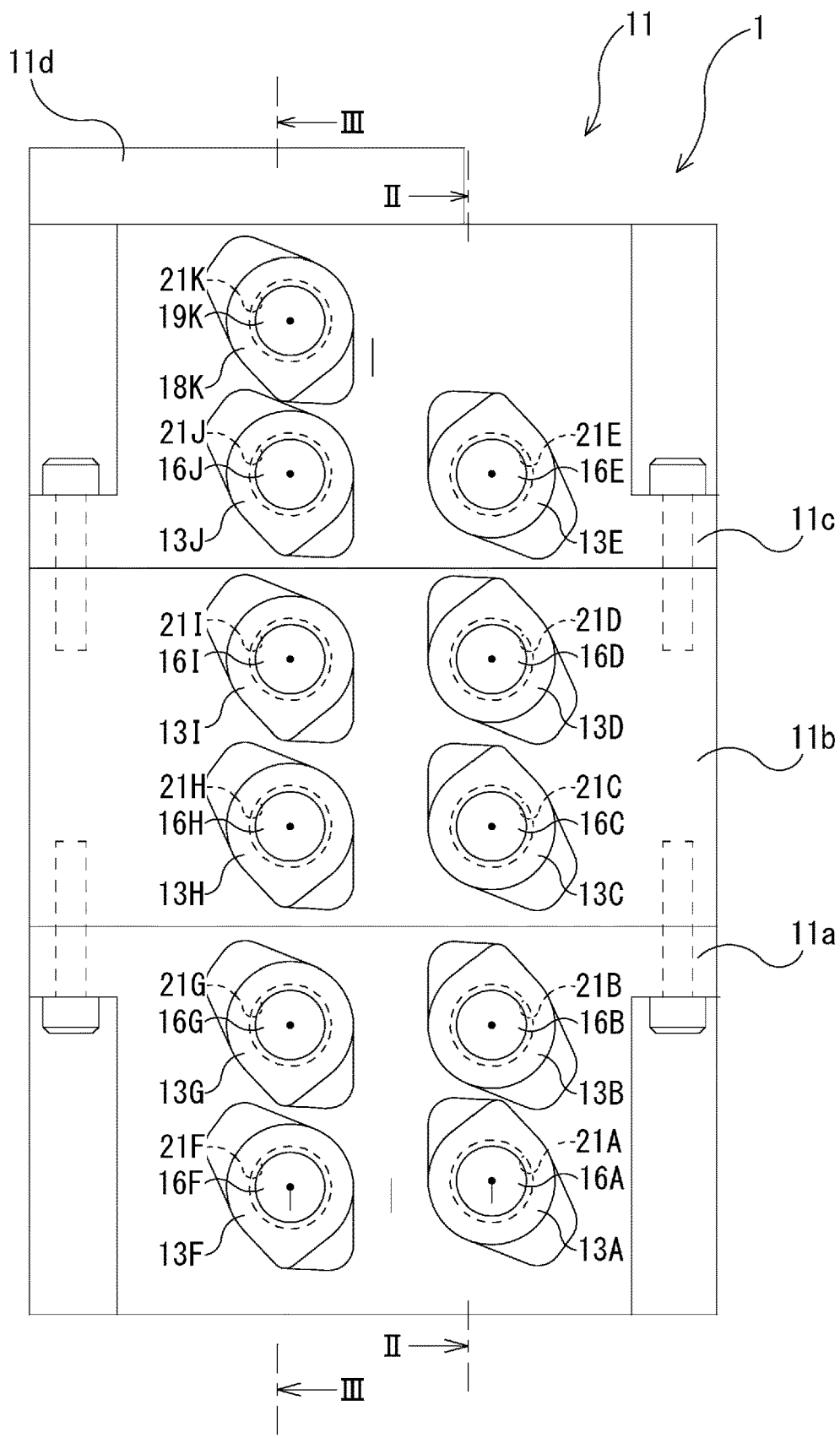
FIG. 1 is a plan view illustrating a multi-control valve device according to Embodiment 1 of the present invention.

Construction equipment or the like such as a hydraulic excavator includes two or more hydraulic actuators such as a hydraulic cylinder and a hydraulic motor and further includes a multi-control valve device 1 such as that illustrated in FIG. 1 in order to control the direction of an operating oil that flows to the hydraulic actuators. The multi-control valve device 1, which is composed of a plurality of directional control valves (in the present embodiment, 10 directional control valves) 2A to 2J that are integrally formed, is configured as follows. Note that in the following description, associated elements are denoted by reference signs with the same alphabet letter.

Figure 2:
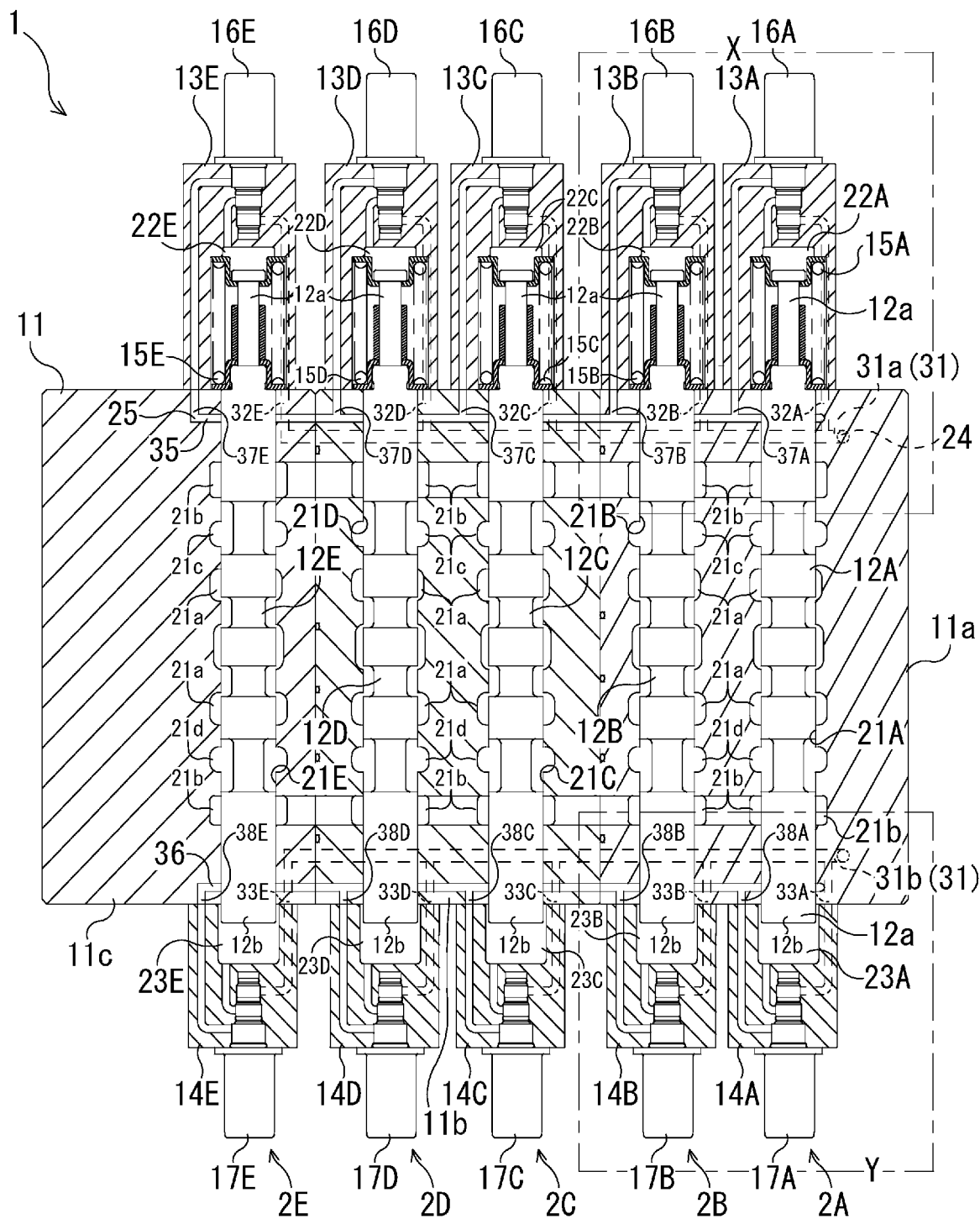
FIG. 2 is a cross-sectional view of the multi-control valve device taken along section line II-II of FIG. 1.
Figure 3:
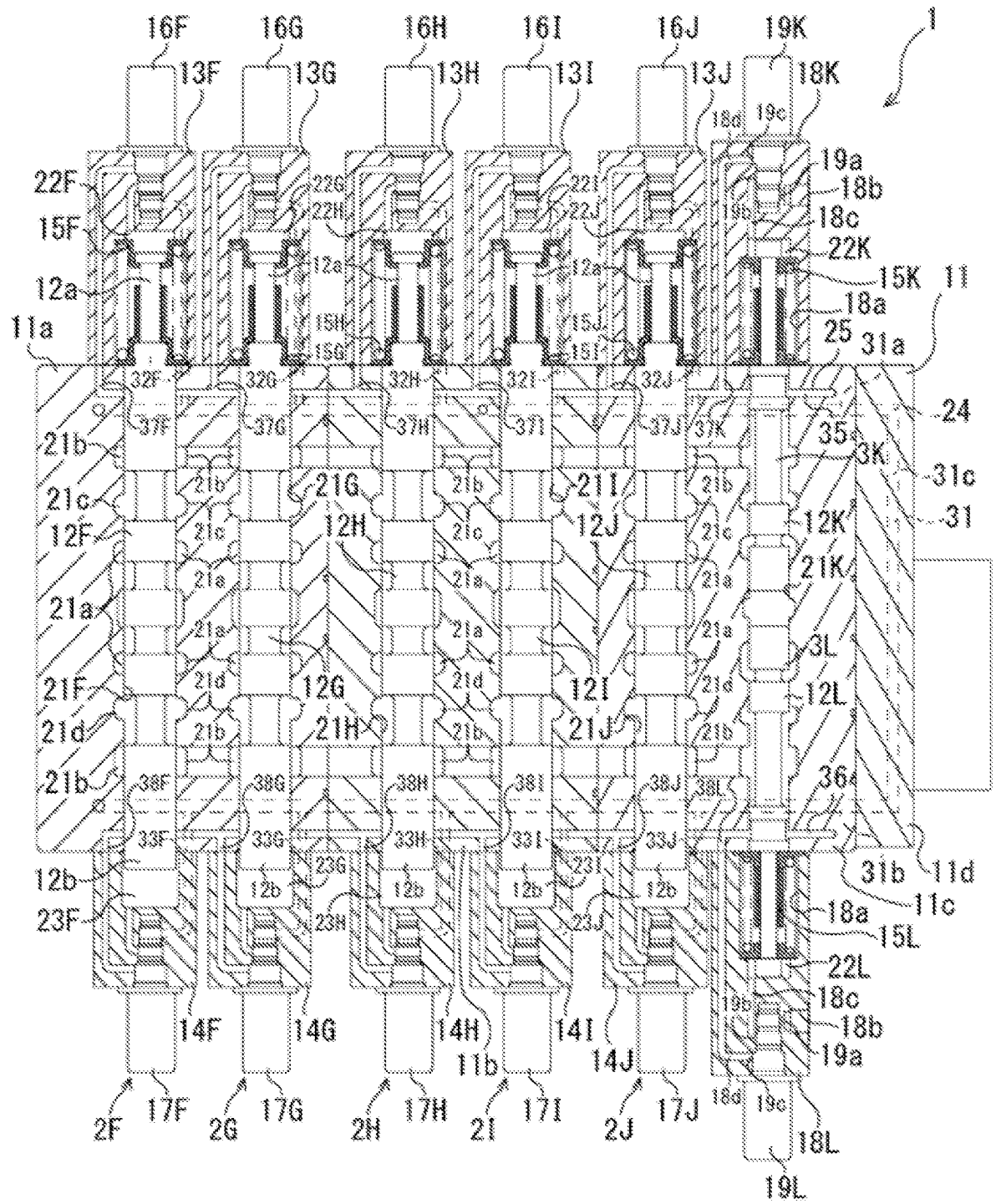
FIG. 3 is a cross-sectional view of the multi-control valve device taken along section line III-III of FIG. 1.

Specifically, in order to form the 10 directional control valves 2A to 2J, the multi-control valve device 1 includes a valve block 11, 10 spools 12A to 12J, a corresponding number of first covers 13A to 13J, a corresponding number of second covers 14A to 14J, a corresponding number of spring mechanisms 15A to 15J, a corresponding number of first solenoid valves 16A to 16J, and a corresponding number of second solenoid valves 17A to 17J, as illustrated in FIGS. 2 and 3. The valve block 11 is formed in the approximate shape of a rectangular parallelepiped, and a plurality of valve holes 21A to 21K penetrating the valve block 11 in the height direction are formed in the valve block 11. In the present embodiment, in the valve block 11, 11 valve holes 21A to 21K are formed, and the 11 valve holes 21A to 21K are arranged in two rows, five valve holes in one row and six valve holes in the other row, along the width of the valve block 11. The spools 12A to 12J are inserted through the 10 valve holes 21A to 21J among the 11 valve holes 21A to 21K.

Specifically, the 10 valve holes 21A to 21J have substantially the same shape and each include a pump port 21a, a tank port 21b, a first port 21c, and a second port 21d. A hydraulic actuator is connected to the first port 21c and the second port 21d; by moving the spools 12A to 12J, the connection destination of the pump port 21a, which leads to a main pump passage, can be changed to the first port 21c and the second port 21d, and thus it is possible to switch the direction of the operating oil that flows to the hydraulic actuator. The spools 12A to 12J have both end portions 12a, 12b protruding from the valve holes 21A to 21J; the first covers 13A to 13J, which are one example of the attachment parts, are placed over the end portions 12a, and the second covers 14A to 14J, which are one example of the attachment parts, are placed over the end portions 12b.

The first covers 13A to 13J, which are one example of the attachment parts, are each formed in the approximate shape of a cylinder having a closed end and are provided on the valve block 11. Each of the first covers 13A to 13J is placed over one of the openings of a corresponding one of the valve holes 21A to 21J so as to cover the opening and house one end of a corresponding one of the spools 12A to 12J in an inner hole 13a. Similarly, the second covers 14A to 14J, which are one example of the attachment parts, are each formed in the approximate shape of a cylinder having a closed end and are provided on the valve block 11. Each of the second covers 14A to 14J is placed over the other of the openings of a corresponding one of the valve holes 21A to 21J so as to cover the opening and house the other end of a corresponding one of the spools 12A to 12J in an inner hole 14a. The two inner holes 13a, 14a form first pressure-receiving chambers 22A to 22J and second pressure-receiving chambers 23A to 23J, and the spools 12A to 12J move by receiving the hydraulic pressures in the pressure-receiving chambers 22A to 22J, 23A to 23J which correspond to the end portions 12a, 12b. Furthermore, the inner holes 13a house the spring mechanisms 15A to 15J, and the spring mechanisms 15A to 15J bias the spools 12A to 12J against the hydraulic pressures in the pressure-receiving chambers 22A to 22J, 23A to 23J. Specifically, the spring mechanisms 15A to 15J bias the spools 12A to 12J so as to return the spools 12A to 12J to the neutral position (that is the position of the spools 12A to 12J blocking the ports 21a to 21d as illustrated in FIGS. 2 and 3); when the difference in the hydraulic pressure between the first pressure-receiving chambers 22A to 22J and the second pressure-receiving chambers 23A to 22J becomes zero, the spools 12A to 12J return to the neutral position. On the other hand, when there is a difference in the hydraulic pressure, the spools 12A to 12J move to a position corresponding to the difference. Therefore, in order to produce a difference in the hydraulic pressure between the pressure-receiving chambers 22A to 22J, 23A to 23J through adjustments, the first solenoid valves 16A to 16J are provided on the first covers 13A to 13J, and the second solenoid valves 17A to 17J are provided on the second covers 14A to 14J.

Figure 4:
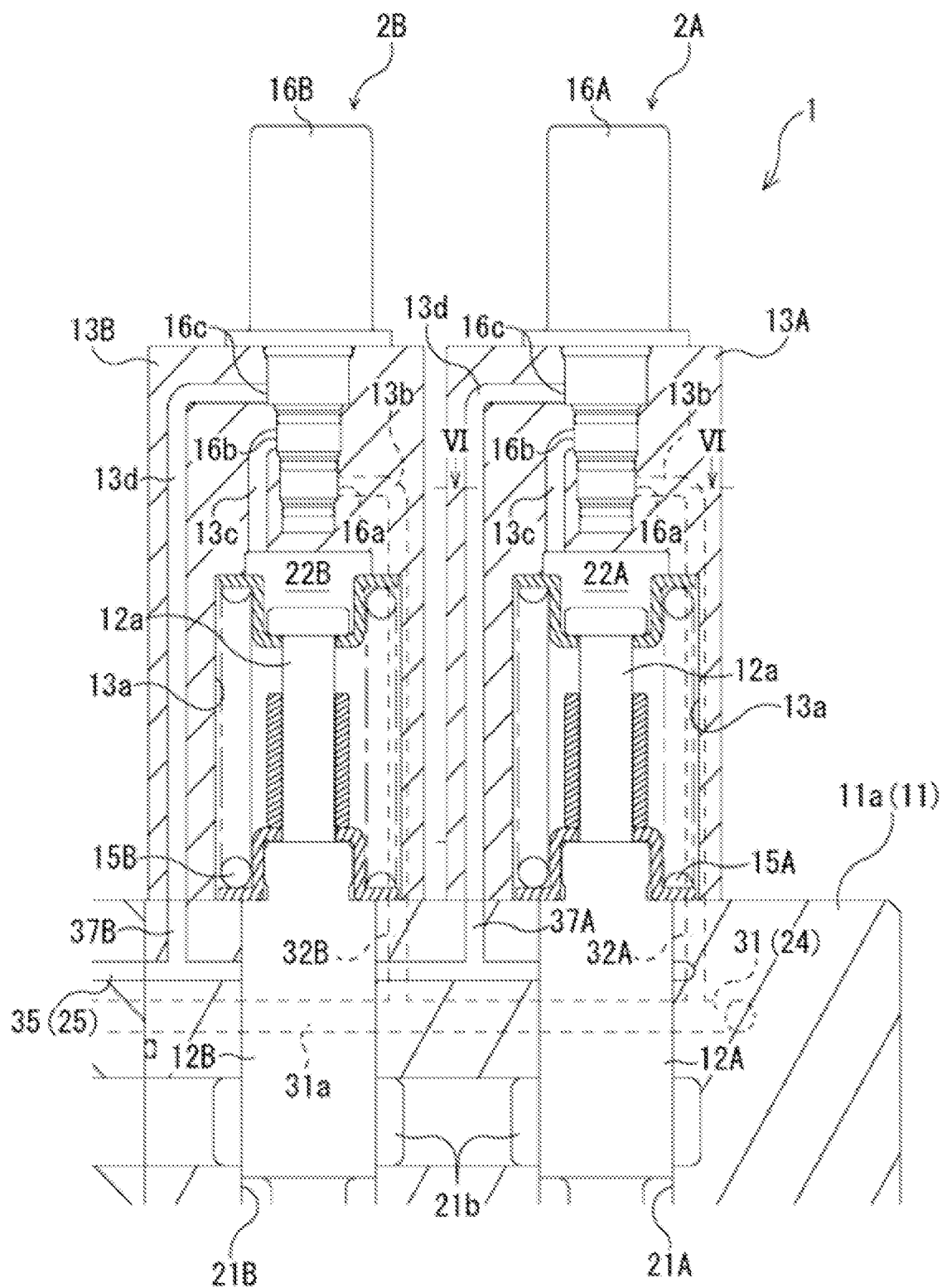
FIG. 4 is an enlarged cross-sectional view of a region X of the multi-control valve device illustrated in FIG. 2.
Figure 6:
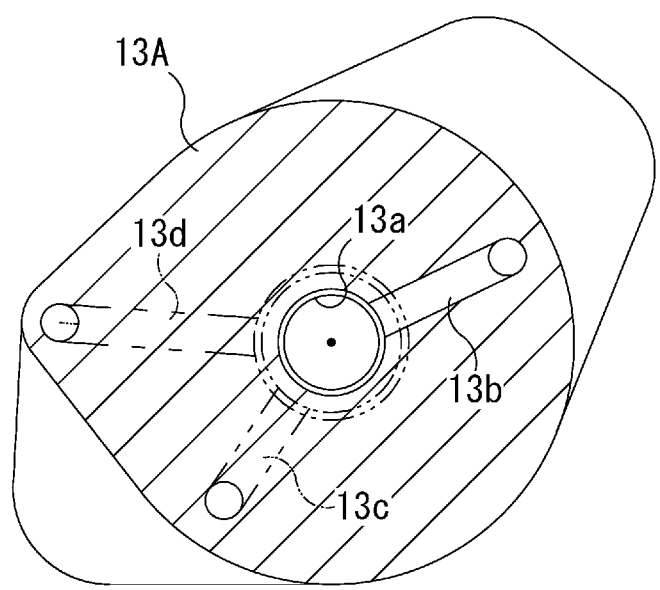
FIG. 6 is an enlarged cross-sectional view of a cover of the multi-control valve device taken along section line VI-VI of FIG. 4.

The first solenoid valves 16A to 16J are, for example, electromagnetic proportional valves, electromagnetic inversely proportional valves, or electromagnetic switch valves. In the present embodiment, the first solenoid valves 16A to 16J are electromagnetic proportional valves and reduce a primary pressure and output a secondary pressure according to received commands. Specifically, each of the first solenoid valves 16A to 16J includes a primary port 16a, a secondary port 16b, and a drain port 16c, as illustrated in FIG. 4. Furthermore, a primary-side passage 13b, a secondary-side passage 13c, and a drain passage 13d are formed in each of the first covers 13A to 13J, and the passages 13b to 13d are disposed with spacing therebetween (in the present embodiment, with approximately 120-degree spacing) around the axial line of a corresponding one of the first solenoid valves 16A to 16J (refer to FIG. 6). The primary-side passage 13b disposed as just described is connected to the primary port 16a in order to supply the primary pressure. The drain passage 13d is connected to the drain port 16c in order to discharge the primary pressure, and the secondary-side passage 13c connects the secondary port 16b and a corresponding one of the first pressure-receiving chambers 22A to 22J. Therefore, by adjusting the degree of opening between the secondary port 16b and the other two ports 16a, 16c, the first solenoid valves 16A to 16J can control the primary pressure and output the secondary pressure to the first pressure-receiving chambers 22A to 22J.

Figure 5:
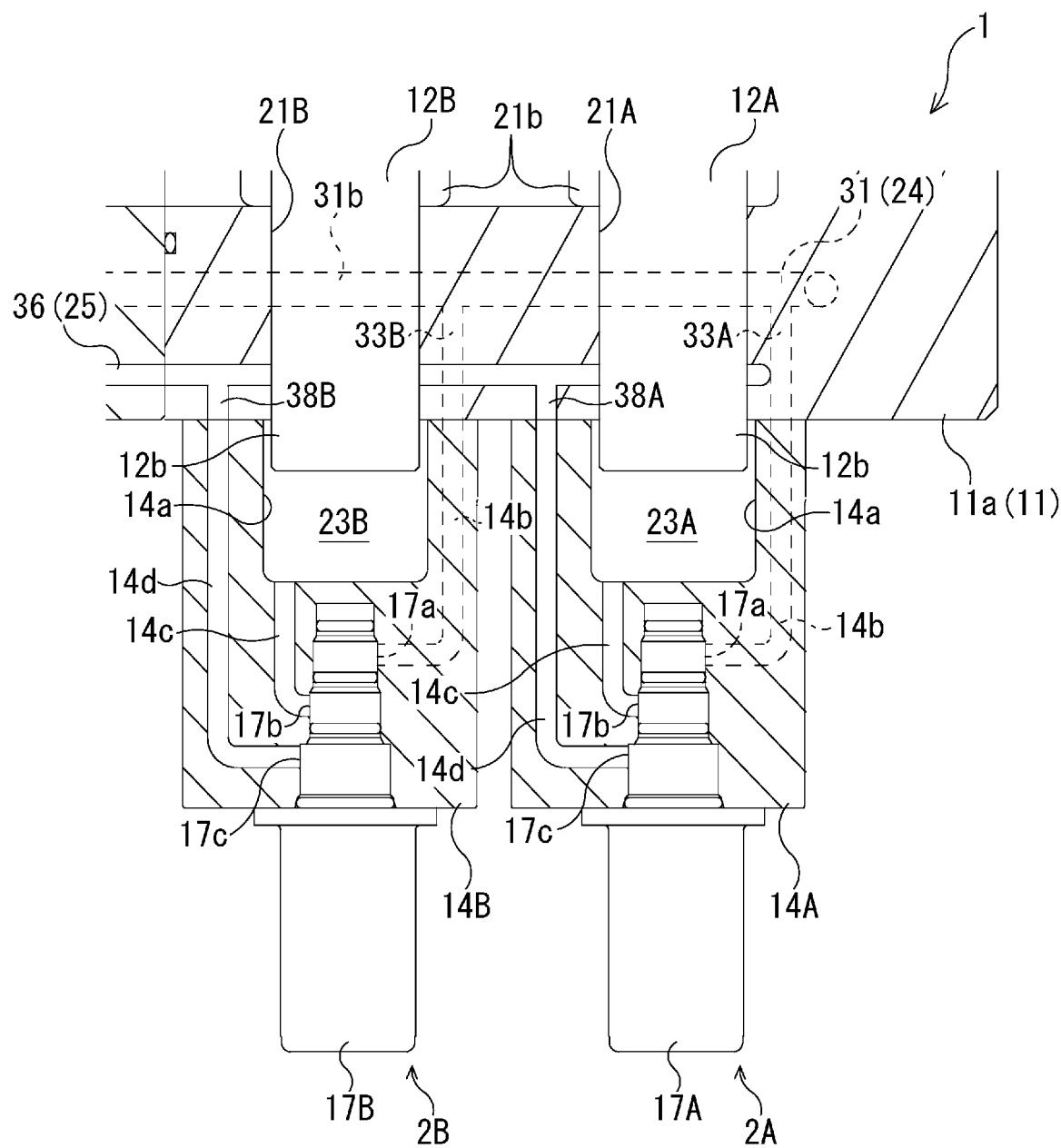
FIG. 5 is an enlarged cross-sectional view of a region Y of the multi-control valve device illustrated in FIG. 2.

Similarly, the second solenoid valves 17A to 17J are, for example, electromagnetic proportional valves, electromagnetic inversely proportional valves, or electromagnetic switch valves. In the present embodiment, the second solenoid valves 17A to 17J are electromagnetic proportional valves and reduce a primary pressure and output a secondary pressure according to received commands. Specifically, as with each of the first solenoid valves 16A to 16J, each of the second solenoid valves 17A to 17J includes a primary port 17a, a secondary port 17b, and a drain port 17c, as illustrated in FIG. 5. Three passages 14b to 14d are formed with spacing therebetween in each of the second covers 14A to 14J, similar to the first covers 13A to 13J. Therefore, by adjusting the degree of opening between the secondary port 17b and the other two ports 17a, 17c, the second solenoid valves 17A to 17J can also control the primary pressure and output the secondary pressure to the second pressure-receiving chambers 23A to 23J.

The multi-control valve device 1 configured as described above further includes two unloader valves 3K, 3L. Specifically, in the multi-control valve device 1, the directional control valves 2A to 2E, 2F to 2J arranged in the rows are connected in parallel with separate main pumps (not illustrated in the drawings), and a corresponding one of the main pumps can be switched between loaded and unloaded states using the unloader valves 3K, 3L. More specifically, the unloader valves 3K, 3L include spools 12K, 12L, respectively, and the spools 12K, 12L are inserted into the valve hole 21K from the openings at both ends and are spaced apart from each other when housed therein. Furthermore, covers 18K, 18L each in the approximate shape of a cylinder having a closed end are provided on the valve block 11; the covers 18K, 18L are placed over the openings of the valve hole 21K at both ends. Inner holes 18a of the covers 18K, 18L form pressure-receiving chambers 22K, 22L in which spring mechanisms 15K, 15L are housed.

The unloader valves 3K, 3L configured as described above change the positions of the spools 12K, 12L by increasing the hydraulic pressures in the pressure-receiving chambers 22K, 22L, and place the corresponding one of the main pumps in the unloaded state. Furthermore, it is possible to place the corresponding one of the main pumps in the loaded state by reducing the hydraulic pressures in the pressure-receiving chambers 22K, 22L and returning the spools 12K, 12L to the loaded positions using the spring mechanisms 15K, 15L. For the unloader valves 3K, 3L configured as described above, solenoid valves 19K, 19L are provided on the covers 18K, 18L in order to control the pressures in the pressure-receiving chambers 22K, 22L.

The solenoid valves 19K, 19L are, for example, electromagnetic proportional valves, electromagnetic inversely proportional valves, or electromagnetic switch valves. In the present embodiment, the solenoid valves 19K, 19L are electromagnetic proportional valves and reduce a primary pressure and output a secondary pressure according to received commands. Specifically, as with each of the first solenoid valves 16A to 16J, each of the solenoid valves 19K, 19L includes three ports 19a to 19c, as illustrated in FIG. 3. Three passages 18b to 18d are formed with spacing therebetween in each of the covers 18K, 18L, similar to the first covers 13A to 13J. Therefore, by adjusting the degree of opening between the secondary port 19b and the other two ports 19a, 19c, the secondary pressure is controlled and then output to the first pressure-receiving chambers 22K, 22L.

Figure 7:
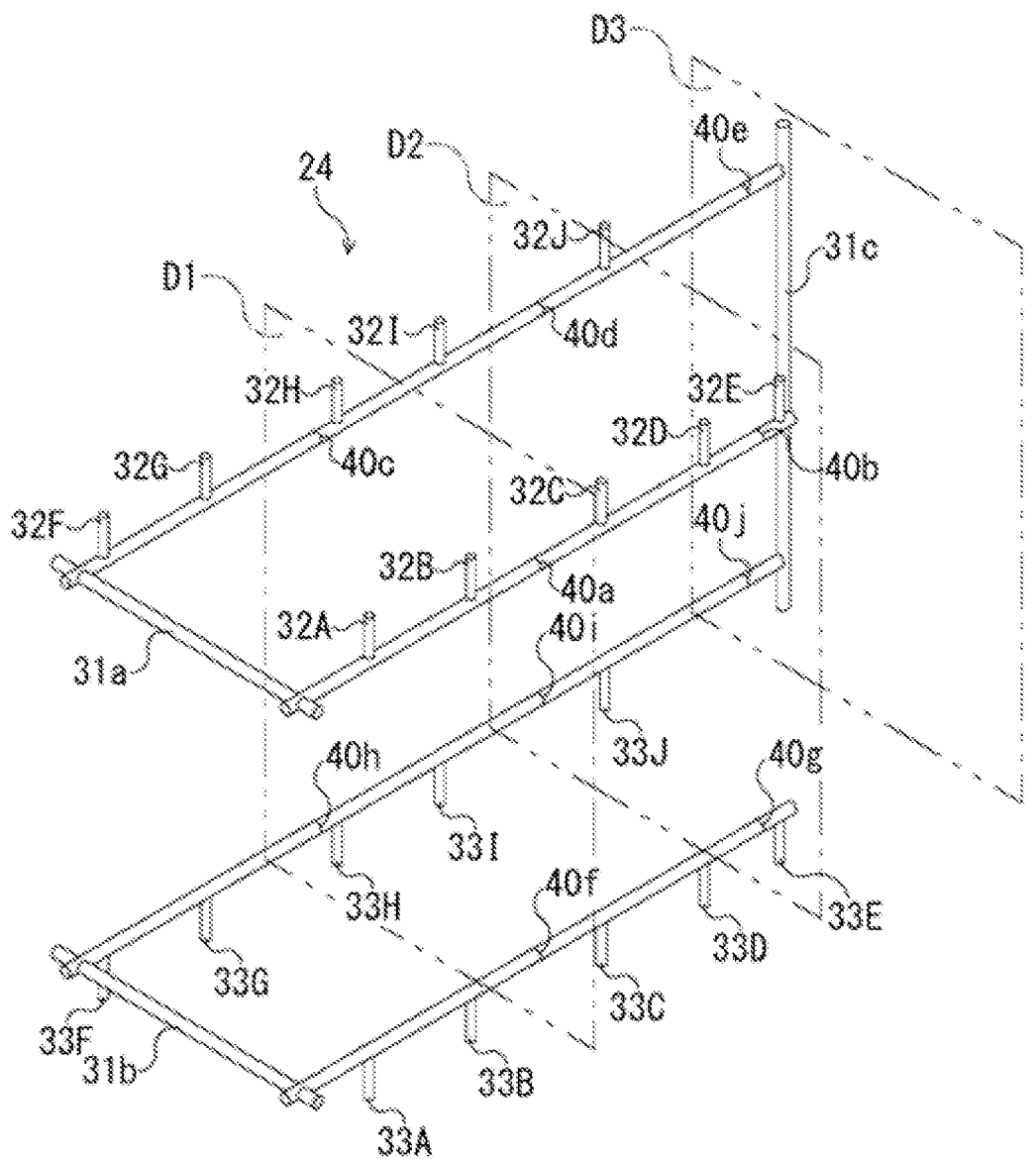
FIG. 7 is a perspective view of a primary pressure supply passage removed from the multi-control valve device illustrated in FIG. 2.

In the multi-control valve device 1 configured as described above, the spools 12A to 12J move according to the secondary pressures output by the solenoid valves 16A to 16J, 17A to 17J, and thus the flow direction and the flow rate of the operating oil are controlled. In the multi-control valve device 1 having such functions, a primary pressure supply passage 24 such as that illustrated in FIGS. 2 and 3 and further in FIG. 7 is formed in the valve block 11 in order to supply the primary pressure to the solenoid valves 16A to 16J, 17A to 17J. Specifically, the primary pressure supply passage 24 includes a main passage 31, a plurality of first branch passages 32A to 32J, and a plurality of second branch passages 33A to 33J.

The main passage 31 includes an upper passage portion 31a, a lower passage portion 31b, and a connecting passage portion 31c. Note that in the present embodiment, the upper passage portion 31a and the lower passage portion 31b are each formed in the approximate U shape elongated in the longitudinal direction and are disposed around the valve holes 21A to 21K so as to avoid the location of the valve holes 21A to 21K and surround the valve holes 21A to 21K. Specifically, the upper passage portion 31a and the lower passage portion 31b are disposed so as to extend along both side surfaces in the width direction and one side surface in the longitudinal direction. The upper passage portion 31a is disposed in an upper area in the valve block 11 (in other words, on the side close to the first solenoid valves 16A to 16J), and the lower passage portion 31b is disposed in a lower area in the valve block 11 (in other words, on the side close to the second solenoid valves 17A to 17J).

Furthermore, a number of first branch passages corresponding to the number of the first solenoid valves 16A to 16J, specifically, 10 first branch passages 32A to 32J, are connected to the upper passage portion 31a. Specifically, the first branch passages 32A to 32J are separately branched from the upper passage portion 31a and are formed so as to correspond to the first solenoid valves 16A to 16J, more specifically, the first covers 13A to 13J. As mentioned earlier, the primary-side passage 13b is formed in each of the first covers 13A to 13J, and each of the first branch passages 32A to 32J extends toward the primary-side passage 13b in a corresponding one of the first covers 13A to 13J. Specifically, each of the first branch passages 32A to 32J extends upward from the upper passage portion 31a and is connected to the primary port 16a of a corresponding one of the first solenoid valves 16A to 16J via the primary-side passage 13b in a corresponding one of the first covers 13A to 13J. Similarly, a number of second branch passages corresponding to the number of the second solenoid valves 17A to 17J, specifically, 10 second branch passages 33A to 33J, are connected to the lower passage portion 31b, and in substantially the same manner as each of the first branch passages 32A to 32J, each of the second branch passages 33A to 33J is connected to the primary port 17a of a corresponding one of the second solenoid valves 17A to 17J via the primary-side passage 14b in a corresponding one of the second covers 14A to 14J.

The two passage portions 31a, 31b formed as described above have one ends connected by the connecting passage portion 31c. Specifically, the connecting passage portion 31c extends vertically, and the two passage portions 31a, 31b are connected to the connecting passage portion 31c in the vicinities of one end and the other end thereof. A sub-pump (not illustrated in the drawings) is connected to the connecting passage portion 31c formed as just described. With this, the primary pressure is supplied to the main passage 31 and is further supplied to the primary ports 16a, 17a of the solenoid valves 16A to 16J, 17A to 17J via the first branch passages 32A to 32J and the second branch passages 33A to 33J. Note that in the present embodiment, the primary port 19a of each of the solenoid valves 19K, 19L is not connected to the primary pressure supply passage 24, and a primary pressure is separately supplied to the primary port 19a through a pipe or the like. Furthermore, in addition to the primary pressure supply passage 24, a drain communicating part 25 is formed in the valve block 11.

The drain communicating part 25 is a passage or the like through which the primary pressure is discharged from the drain port 16c, and includes an upper shared part 35, a lower shared part 36, a plurality of first individual passages 37A to 37K, and a plurality of second individual passages 38A to 38J, 38L. Each of the upper shared part 35 and the lower shared part 36 is a space extending in a plane (in the present embodiment, a plate-shaped space parallel to the upper and lower surfaces) and is formed as follows. Specifically, the upper shared part 35 is disposed closer to the first covers 13A to 13J than the upper passage portion 31a is (in other words, on the outer side) and is formed in a location other than the location of the first branch passages 32A to 32J so as not to communicate with the first branch passages 32A to 32J. Similarly, the lower shared part 36 is disposed closer to the second covers 14A to 14J than the lower passage portion 31b is (in other words, on the outer side) and is formed in a location other than the location of the second branch passages 33A to 33J so as not to communicate with the second branch passages 33A to 33J.

Furthermore, a number of first individual passages corresponding to the number of the first solenoid valves 16A to 16J and the unloader valve 3K, specifically, 11 first individual passages 37A to 37K, are connected to the upper shared part 35. The first individual passages 37A to 37K are formed so as to correspond to the first solenoid valves 16A to 16J and the solenoid valve 19K, more specifically, the first covers 13A to 13J and the cover 18K. Each of the first individual passages 37A to 37K formed as just described extends from the upper shared part 35 toward a corresponding one of the drain passages 13d, 18d in the first covers 13A to 13J and the cover 18K, and is connected to a corresponding one of the drain ports 16c, 19c of the first solenoid valves 16A to 16J, 19K via a corresponding one of the drain passages 13d, 18d. Similarly, a number of second individual passages corresponding to the number of the second solenoid valves 17A to 17J and the solenoid valve 19L, specifically, 11 second individual passages 38A to 38J, 38L, are connected to the lower shared part 36, and in substantially the same manner as the first individual passages 37A to 37K, each of the second individual passages 38A to 38J, 38L is connected to a corresponding one of the drain ports 17c, 19c of the second solenoid valves 17A to 17J, 19L via a corresponding one of the drain passages 14d, 18d in the second covers 14A to 14J and the cover 18L. Therefore, the primary pressure discharged from the drain ports 16c, 17c, and 19c can be guided to a drain connecting port 21e via the drain passages 13d, 14d, 18d and the drain communicating part 25 and then discharged into a drain not illustrated in the drawings. In other words, in the multi-control valve device 1, the solenoid valves 16A to 16J, 17A to 17J, 19K, 19L can reduce the primary pressure and output the secondary pressure to change the positions of the spools 12A to 12L. Thus, the direction and the flow rate of the operating oil can be changed, and the main pump can be unloaded. In the multi-control valve device 1 configured as described above, the valve block 11 is configured as follows.

Specifically, in the valve block 11, the valve holes 21A to 21E, 21F to 21K are arranged in a predetermined direction (in the present embodiment, in the longitudinal direction). Furthermore, the valve block 11 is configured to be separable into a plurality of sub-blocks, four sub-blocks in the present embodiment, in the longitudinal direction. Specifically, the valve block 11 includes three sub-blocks 11a to 11c and a plate 11d. Each of the sub-blocks 11a to 11c is configured as follows. Each of the sub-blocks 11a to 11c is formed in the approximate shape of a rectangular parallelepiped elongated in the width direction, and the four directional control valves 2A, 2B, 2F, 2G are formed in the first sub-block 11a. The four directional control valves 2C, 2D, 2H, 2I are formed in the second sub-block 11b, and the two directional control valves 2E, 2J and the unloader valves 3K, 3L are formed in the third sub-block 11c. These three sub-blocks 11a to 11c are disposed so that the second sub-block 11b is sandwiched by the first sub-block 11a and the third sub-block 11c, and adjacent ones of the sub-blocks 11a to 11c are joined together with bolts. This allows a reduction in the deformation of the valve holes 21A to 21K. Furthermore, the plate 11d is provided on a side of the third sub-block 11c that is opposite to a side on which the second sub-block 11b abuts, and the aforementioned connecting passage portion 31c is formed on the plate 11d.

In the valve block 11 configured as described above, holes are drilled as the upper passage portion 31a and the lower passage portion 31b of the primary pressure supply passage 24. If the valve block is an integrated, inseparable object, each portion of the upper passage portion 31a and the lower passage portion 31b that extends in the longitudinal direction needs to be formed as one long hole penetrating the valve block from one side to the other side in the longitudinal direction. In contrast, since the valve block 11 is divided into the sub-blocks 11a to 11c by dividing sections D1 to D3 illustrated in FIG. 7, the aforementioned long hole can be formed on a per sub-block basis (refer to dividing portions 40a to 40j in FIG. 7). In other words, at the time of formation, the long hole can be divided into two more parts, at least three parts in the present embodiment, meaning that the upper passage portion 31a and the lower passage portion 31b can be easily formed. Furthermore, in the valve block 11, the longitudinal lengths of the three sub-blocks 11a to 11c are set to be substantially equal. Therefore, each of the three sub-blocks 11a to 11c can be made small in size and formed so that the difference in weight between the three sub-blocks 11a to 11c is small, and it is possible to improve the portability of the valve block 11.

In the multi-control valve device 1 configured as described above, the primary pressure supply passage 24 is formed in the valve block 11, and therefore a portion of the primary pressure supply passage 24 can be shared; thus, the shape of the primary pressure supply passage 24 can be simplified, and the configuration of the valve block 11 can be simplified. Specifically, in the multi-control valve device 1, the main passage 31 is individually connected to the solenoid valves 16A to 16J, 17A to 17J via the branch passages 32A to 32J, 33A to 33J, and thus a portion of the primary pressure supply passage 24 can be shared. Therefore, the shape of the primary pressure supply passage 24 can be simplified, and the configuration of the valve block 11 can be simplified. The same is true for the drain communicating part 25; a portion of the drain communicating part 25 can be shared as a result of the individual passages 37A to 37K, 38A to 38J, 38L being branched from the shared parts 35, 36; thus, the shape of the drain communicating part 25 can be simplified, and the configuration of the valve block 11 can be simplified.

Furthermore, as a result of forming the branch passages 32A to 32J, 33A to 33J in the valve block 11, each of the solenoid valves 16A to 16J, 17A to 17J can be individually connected to the primary pressure supply passage 24. Accordingly, it is possible to configure the multi-control valve device 1 in which the solenoid valves 16A to 16J, 17A to 17J can be individually detached from the valve block 11, in other words, the covers 13A to 13J, 14A to 14J can be individually detached from the valve block 11. The drain communicating part 25 is also formed in the valve block 11, allowing the upper shared part 35 and the lower shared part 36 to be individually connected to the solenoid valves 16A to 16J, 17A to 17J via the individual passages 37A to 37K, 38A to 38J, 38L. Therefore, it is possible to configure the multi-control valve device 1 in which the solenoid valves 16A to 16J, 17A to 17J can be individually detached, as in the case of the primary pressure supply passage 24.

In this manner, the covers 13A to 13J, 14A to 14J are individually formed, allowing the multi-control valve device 1 to have increased design flexibility; furthermore, it is possible to manufacture the useful multi-control valve device 1 in which the solenoid valves 16A to 16J, 17A to 17J can be individually detached. Moreover, since the covers 13A to 13J, 14A to 14J are individually formed, a reduction in size and weight is possible as compared to the case where the covers 13A to 13J, 14A to 14J are integrally formed, and the covers 13A to 13J, 14A to 14J can be formed into different shapes. When two or more covers are integrally formed, all the covers need to be detached to replace even one spool. In contrast, when the covers 13A to 13J, 14A to 14J are individually formed as in the multi-control valve device 1 according to the present embodiment, it is possible to access the spools 12A to 12J by detaching only the corresponding covers 13A to 13J, 14A to 14J for the spools 12A to 12J that need to be replaced, leading to easy maintenance.

Furthermore, as a result of forming the upper shared part 35 on the outer side of the upper passage portion 31a and forming the lower shared part 36 on the outer side of the lower passage portion 31b, it is possible to effectively use dead space in the valve block 11, keeping the valve block 11 from increasing in size.

Embodiment 2

A multi-control valve device 100 according to Embodiment 2 is similar in configuration to the multi-control valve device 1 according to Embodiment 1. Therefore, the configuration of the multi-control valve device 100 according to Embodiment 2 will be described focusing on differences from the multi-control valve device 1 according to Embodiment 1; elements that are the same as those of the multi-control valve device 1 according to Embodiment 1 share the same reference signs, and as such, description of the elements will be omitted. The same applies to a multi-control valve device 200 according to Embodiment 3.

Figure 8:
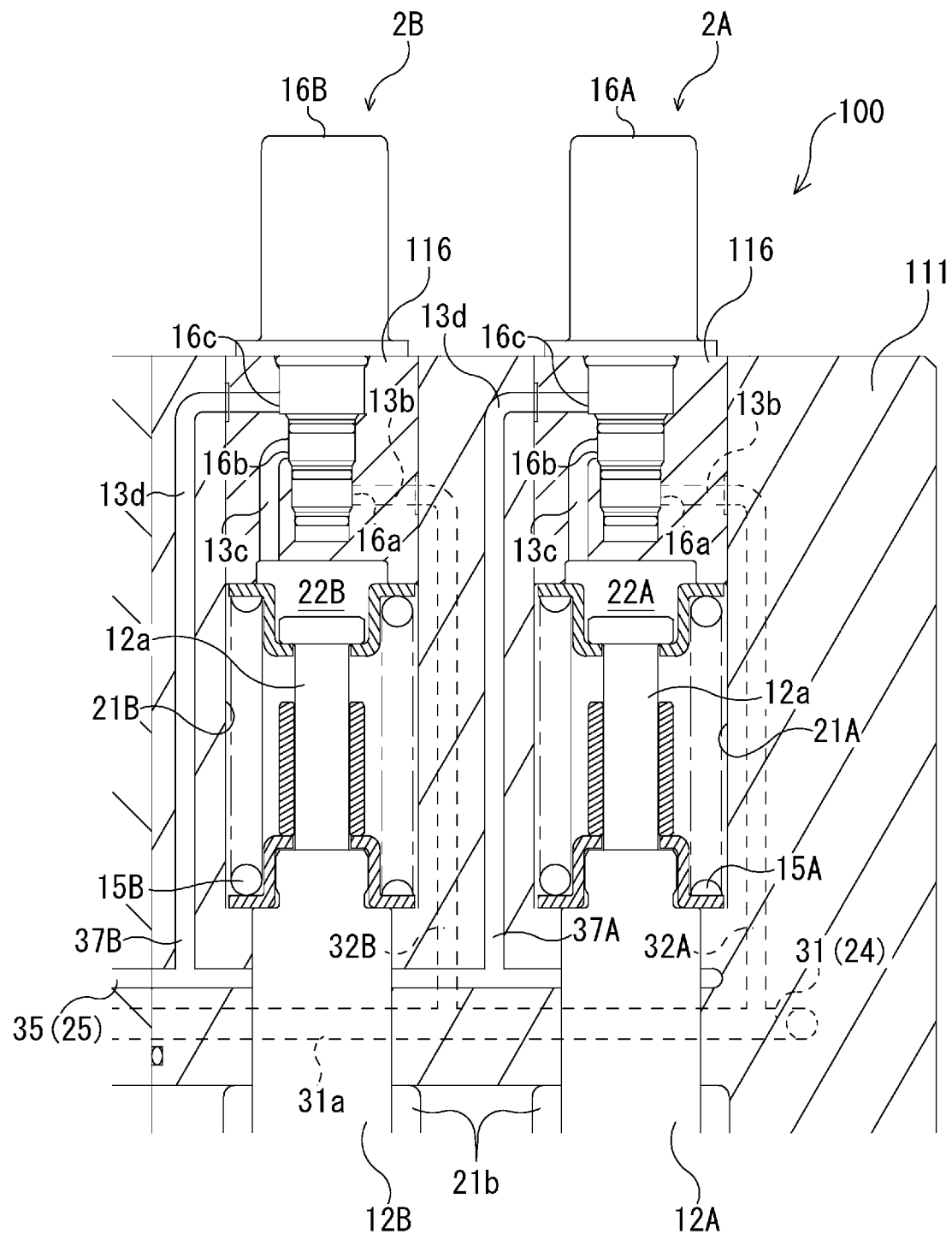
FIG. 8 is a plan view illustrating a portion of a multi-control valve device according to Embodiment 2 of the present invention.

In the multi-control valve device 100, each of the valve holes 21A to 21J in a valve block 111 is formed to be longer than that according to Embodiment 1, and the first solenoid valves 16A to 16J are provided on the upper openings of the valve holes 21A to 21J, as illustrated in FIG. 8. Note that for the sake of explanation, FIG. 8 illustrates only the valve holes 21A, 21B and elements relevant thereto. More specifically, the first solenoid valves 16A to 16J are formed as a unit by being inserted into casings 116 each in the shape of a circular cylinder, and are screwed into the upper openings of the valve holes 21A to 21J and then fixed in the form of the unit. The first pressure-receiving chambers 22A to 22J are formed between the spools 12A to 12J and the casings 116, which are one example of the attachment parts, and the spring mechanisms 15A to 15J are housed in the first pressure-receiving chambers 22A to 22J. Furthermore, the primary-side passage 13b, the secondary-side passage 13c, and the drain passage 13d are formed in each of the casings 116, as in each of the first covers 13A to 13J according to Embodiment 1, and the primary-side passage 13b is connected to a corresponding one of the first branch passages 32A to 32J. The secondary-side passage 13c is connected to a corresponding one of the first pressure-receiving chambers 22A to 22J, and the drain passage 13d is connected to a corresponding one of the first individual passages 37A to 37K.

In the multi-control valve device 100 configured as described above, the first solenoid valves 16A to 16J in the form of the unit can be individually attached to the valve block 111, allowing the multi-control valve device 100 to have improved design flexibility. Furthermore, the first solenoid valves 16A to 16J in the form of the unit can be individually detached from the valve block 111, and thus substantially the same advantageous effects as the multi-control valve device 1 according to Embodiment 1 are produced. Note that although Embodiment 2 has thus far described the first solenoid valves 16A to 16J, the second solenoid valves 17A to 17J may have substantially the same configuration.

Embodiment 3

Figure 9:
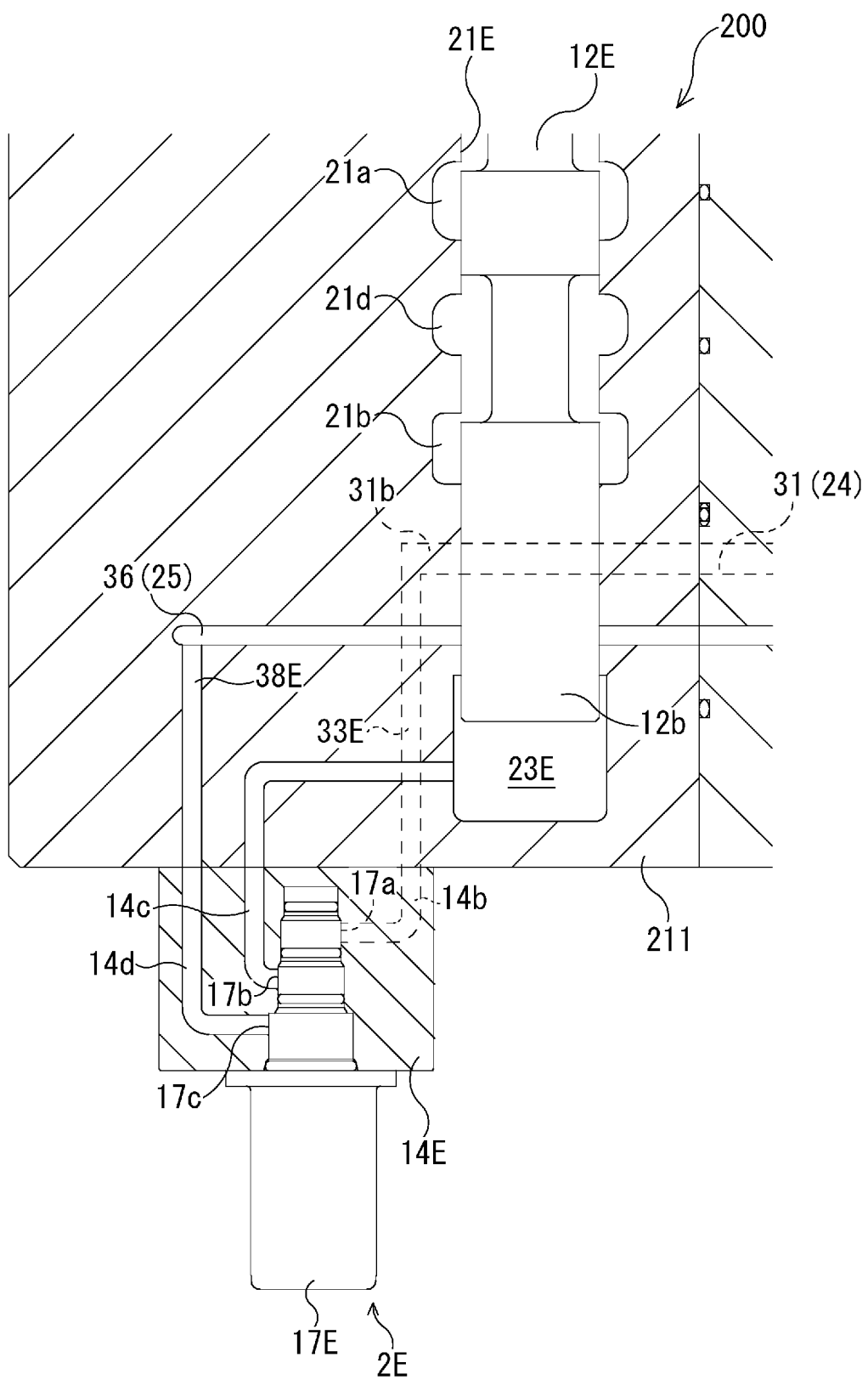
FIG. 9 is a plan view illustrating a portion of a multi-control valve device according to Embodiment 3 of the present invention.

In the multi-control valve device 200, the second covers 14A to 14J and the spools 12A to 12J are disposed so that the axial lines thereof do not overlap each other in a plan view and a side view, as illustrated in FIG. 9. Note that for the sake of explanation, FIG. 9 illustrates only elements relevant to the second cover 14E and the spool 12E. When the primary pressure supply passage 24 is formed in a valve block 211 and the primary pressure is supplied individually to the second solenoid valves 17A to 17J through the second branch passages 33A to 33J, the second covers 14A to 14J can be separate. Thus, the positions at which the second covers 14A to 14J are to be disposed are not limited and as mentioned earlier, the second covers 14A to 14J can be disposed to be offset from the axial lines of the spools 12A to 12J; in other words, the multi-control valve device 200 has improved design flexibility. Note that it is possible to downsize the multi-control valve device 200 by disposing the second solenoid valves 17A to 17J in the form of a unit, such as those in Embodiment 2, to be offset from the axial lines of the spools 12A to 12J. Furthermore, the first solenoid valves 16A to 16J can be formed to have substantially the same configuration as that just described. Aside from this, the multi-control valve device 200 can produce substantially the same advantageous effects as the multi-control valve device 1 according to Embodiment 1.

Other Embodiments

In the multi-control valve devices 1, 100, 200, the number of valve holes 21A to 21K is 11, but may be between 2 and 10, inclusive, and may be greater than or equal to 12. Furthermore, regarding the arrangement of the valve holes 21A to 21K formed in two rows, the number of rows of the valve holes 21A to 21K does not necessarily need to be two, and it is not even necessary to dispose the valve holes 21A to 21K in rows. Moreover, the number of sub-blocks in the valve block 11 is not necessarily limited to 3 and may be 2 or may be 4 or more. In other words, the number of divisions of the valve block 11 may be 3 or may be 5 or more. Furthermore, the valve block 11 does not necessarily need to include the plate 11d; in this case, it is sufficient that the connecting passage portion 31c be formed in the sub-block.

The valves formed in the valve holes 21A to 21K do not necessarily need to be all electromagnetic spool valves; it is sufficient that at least two valves be electromagnetic spool valves, and pilot spool valves may be included. Each of the upper shared part 35 and the lower shared part 36 is a plate-shaped space, but does not necessarily need to be a space and may be a passage. The shape of each of the primary pressure supply passage 24 and the drain communicating part 25 is merely one example and is not limited to the aforementioned shape; separate primary pressure supply passages and separate drain communicating parts for the respective rows may be formed, and it is sufficient that branch passages individually connected to the solenoid valves be formed. Furthermore, the primary pressure supply passage 24 does not necessarily need to include the branch passages. For example, the primary port 16a of each of the solenoid valves 16A to 16J may be directly connected to the main passage 31 of the primary pressure supply passage 24. Specifically, on the primary pressure supply passage 24, the solenoid valves 16A to 16J do not necessarily need to be connected in parallel, which is the case in Embodiments 1 to 3, but may be connected in series.

Furthermore, in the multi-control valve devices 1, 100, 200, the covers 13A to 13J, 14A to 14J are individually provided in a one-to-one correspondence with the solenoid valves 16A to 16J, 17A to 17J, but this configuration is not always required. Specifically, at least two of the first covers 13A to 13J and the cover 18K may be integrally formed, and at least two of the second covers 14A to 14J and the cover 18L may be integrally formed.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST 1, 100, 200 multi-control valve device
11, 111, 211 valve block
12A-12J spool
13A-13J first cover (attachment part)
13b primary-side passage
13c secondary-side passage
13d drain passage
14A-14J second cover (attachment part)
14b primary-side passage
14c secondary-side passage
14d drain passage
16A-16J first solenoid valve
16a primary port
16b secondary port
16c drain port
17A-17J second solenoid valve
17a primary port
17b secondary port
17c drain port
21A-21J valve hole
22A-22J first pressure-receiving chamber
23A-23J second pressure-receiving chamber
24 primary pressure supply passage
25 drain communicating part
32A-32J first branch passage
33A-33J second branch passage
35 upper shared part
36 lower shared part
37A-37K first individual passage
38A-38J, 38L second individual passage
116 casing (attachment part)

The invention claimed is:

1. A multi-control valve device comprising:
a valve block including a plurality of valve holes;
a plurality of spools movably housed in the plurality of valve holes in a one-to-one correspondence;
one or more attachment parts provided on the valve block;
a plurality of spring mechanisms each of which is housed in a corresponding one of the one or more attachment parts and returns a corresponding one of the plurality of spools to a neutral position; and
a plurality of solenoid valves each provided on the corresponding one of the one or more attachment parts in a one-to-one correspondence with the plurality of spools and each of which reduces a primary pressure, outputs a secondary pressure to a corresponding one of the plurality of spools, and moves the spool, wherein:
the valve block includes a primary pressure supply passage through which the primary pressure is supplied to each of the plurality of solenoid valves.

2. The multi-control valve device according to claim 1, wherein:
the plurality of valve holes are aligned in a predetermined direction in the valve block;
the primary pressure supply passage extends in the predetermined direction; and
the valve block is formed to be separable into a plurality of sub-blocks in the predetermined direction.

3. The multi-control valve device according to claim 1, wherein:
the plurality of solenoid valves include drain ports from each of which the primary pressure is discharged;
the valve block includes a drain communicating part connected to each of the drain ports; and
the drain communicating part includes a plurality of individual passages individually connected to the drain ports in a one-to-one correspondence and a shared part connected to the plurality of individual passages.

4. The multi-control valve device according to claim 3, wherein:
the plurality of valve holes are aligned in a predetermined direction in the valve block;
the primary pressure supply passage includes a main passage extending in the predetermined direction;
the valve block is formed to be separable into a plurality of sub-blocks in the predetermined direction; and
the shared part is a space extending in a plane and is formed outside the main passage in the valve block.

5. The multi-control valve device according to claim 1, wherein:
each of the plurality of solenoid valves includes a secondary port from which the secondary pressure is output;
each of the plurality of spools moves by receiving the secondary pressure guided into a pressure-receiving chamber; and
each of the one or more attachment parts forms the pressure-receiving chamber and includes a secondary-side passage connecting the pressure-receiving chamber and the secondary port.

6. The multi-control valve device according to claim 5, wherein:
each of the plurality of solenoid valves includes a primary port to which the primary pressure is supplied and a drain port from which the primary pressure is discharged;
each of the one or more attachment parts further includes a primary-side passage connecting the primary port and the primary pressure supply passage and a drain passage connected to the drain port; and
the primary-side passage, the second-side passage, and the drain passage are disposed with spacing therebetween around an axial line of a corresponding one of the plurality of solenoid valves.

7. The multi-control valve device according to claim 1, wherein:
the one or more attachment parts are a plurality of attachment parts provided to individually attach the plurality of solenoid valves to the valve block;
each of the plurality of solenoid valves includes a primary port to which the primary pressure is supplied; and
in each of the plurality of attachment parts, a primary-side passage connecting the primary port and the primary pressure supply passage is formed.

* * * * *